United States Patent [19]
Wichman

[11] Patent Number: 5,822,579
[45] Date of Patent: Oct. 13, 1998

[54] MICROPROCESSOR WITH DYNAMICALLY CONTROLLABLE MICROCONTROLLER CONDITION SELECTION

[75] Inventor: Shannon A. Wichman, Dallas, Tex.

[73] Assignee: Texas Instruments Incorporated, Dallas, Tex.

[21] Appl. No.: 960,796

[22] Filed: Oct. 30, 1997

[51] Int. Cl.[6] .................................................. G06F 9/22
[52] U.S. Cl. ............................................................. 395/595
[58] Field of Search .............................................. 395/595

[56] References Cited

U.S. PATENT DOCUMENTS

| | | | |
|---|---|---|---|
| 5,193,206 | 3/1993 | Mills ................................. | 395/800.41 |
| 5,222,244 | 6/1993 | Carbine et al. ................... | 395/800.41 |
| 5,581,717 | 12/1996 | Boggs et al. ...................... | 395/384 |
| 5,668,985 | 9/1997 | Carbine et al. ................... | 395/595 |
| 5,673,427 | 9/1997 | Brown et al. ..................... | 395/595 |

*Primary Examiner*—Robert B. Harrell
*Assistant Examiner*—Kenneth R. Coulter
*Attorney, Agent, or Firm*—Robert D. Marshall, Jr.; James C. Kesterson; Richard L. Donaldson

[57] ABSTRACT

A microprocessor (5) having a floating-point unit (31) with internal microcode control therein is disclosed. The microcode control is effected by a microsequencer (47) having a microcode ROM (68) and control circuitry (80) therein. A scheduler circuit (50) forwards status and condition information, such as results from floating-point operations received on buses (REG, RES, FS, X1) from elsewhere in the microprocessor (5), to a condition circuit (76; 76') in the microsequencer (47). The condition circuit (76; 76') includes a multiplexer (80) receiving each of the status values (STAT0 through STATn), along with a loop counter (81) and a programmable comparator (82). Microinstructions ($\mu$WORD) accessed from the microcode ROM (68) include a select field (SEL), for controlling the multiplexer (80) to select one of the status values (STAT0 through STATn) or the contents of the counter (81) for comparison, an immediate field (IMMED) applied to the comparator (82) to supply a value against which the selected status value (STAT0 through STATn) or counter value is to be compared, and a type field (TYP) for selecting the type of comparison to be performed by the comparator (82). According to an alternative embodiment of the invention, a mask field (MASK) is applied to the output of the multiplexer (80) and to the immediate field (IMMED), so that the comparison is made only relative to selected bits therein. Microprogram control is then made in response to the result of the comparison made in the condition circuitry (76).

28 Claims, 4 Drawing Sheets

MICROPROCESSOR WITH DYNAMICALLY CONTROLLABLE MICROCONTROLLER CONDITION SELECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of integrated circuits, and is more specifically directed to microcontrollers within microprocessors.

In the field of microprocessor architecture, the use of microprogram control in the execution of complex algorithmic sequences has become commonplace. As is fundamental in the art, microprogram control is generally implemented and performed by a microcontroller (also referred to in the art, synonymously, as a microsequencer), that is internal to the microprocessor. Conventional microcontrollers include a microcode read-only memory (ROM) which stores sets of control signals in the form of addressable microinstructions, along with circuitry for controlling the sequence in which microinstructions are accessed from the microcode ROM. A microprogram sequence is typically initiated by instruction decode or scheduling circuitry within the instruction pipeline applying a microcode entry address to the microcontroller, where the microcode entry address corresponds to a complex microprocessor instruction to be executed. Upon receipt of a microcode entry address, the microcontroller takes control of the operation of the microprocessor according to a sequence of microinstructions, stored in and accessed from the microcode ROM beginning with the microinstruction addressed by the microcode entry address. Upon completion of the microinstruction sequence, which may range in length from one to many microinstructions, control is returned to the main instruction pipeline.

Similarly as any other program, microinstruction sequences typically include conditional branches and jumps to permit efficient use of microprocessor resources and to provide flexibility in program execution. For example, microcontrollers are often included within on-chip floating-point units (FPUs) in modern microprocessors. Many floating-point routines, such as discrete Fourier transforms, iterative convergence algorithms, and evaluation of trigonometric and transcendental functions, require repeated execution of microcoded routines for execution of complex numerical calculations, and may use a wide range of conditions for conditional microprogram control in execution.

Another type of microprocessor task that is often microcoded and that utilizes frequent and complex conditional branching is the execution of programs by one microprocessor of programs that are "native" to microprocessors of a different architecture. For example, a microprocessor of the so-called very-long-instruction-word (VLIW) or reduced instruction set computer (RISC) architecture may be called upon to emulate a complex instruction set computer (CISC) in executing a program. CISC instructions will generally be implemented as microcoded sequences in a VLIW or RISC processor, considering that individual instructions native to the VLIW microprocessor are by definition less complex than those in the emulated CISC processor.

Especially in these types of applications, it is desirable to provide the microcontroller with maximum microprogram flexibility by permitting it to use many different conditions and status bits in the microprocessor in conditional microprogram control. However, the hardware size and complexity or loss of program performance required to provide such flexibility can be quite significant, according to conventional techniques.

Typically, microcontrollers are implemented with the capability to test only a restrictive set of static conditions. This requires execution circuitry, outside of the microcontroller but under the control of microinstructions in the microprogram, to perform the conditional testing and branching necessary in the microprogram. According to this approach, in order to test the contents of a general condition (i.e., a condition not present in the restrictive set of conditions) the microprogram would include microinstructions directed to gathering the appropriate condition information, storing the limit against which the condition is to be tested, performing the comparison, and then testing a status flag in a control word to retrieve the result. The implementation of complex algorithms requiring such condition testing, according to this conventional architecture, thus necessitates both long microcode sequences (and thus increased size in the microcode ROM), as well as many machine cycles to execute the long microcode sequences.

Another conventional approach to providing complex conditional microprogram control is to increase the size of the set of status and condition bits available for testing by the microcontroller in each microinstruction, in order to reduce the amount of microcode required to perform condition testing. However, simply increasing the size of the static array of status bits causes a corresponding increase in the compare logic within the microcontroller, and thus a corresponding increase in the width of the microcode microinstruction word (and thus in the width of the microcode ROM) to accommodate the additional conditions and status bits available for test.

BRIEF SUMMARY OF THE INVENTION

It is therefore an object of the present invention to provide an architecture for a microcontroller or microsequencer in which a wide range of condition testing may be efficiently implemented.

It is a further object of the present invention to provide a microprocessor having such a microsequencer associated with an execution unit therein.

It is a further object of the present invention to provide such a microprocessor in which a wide range of conditions and status information may be examined efficiently within a microcoded sequence.

It is a further object of the present invention to provide such a microprocessor in which the condition testing may be performed within a single machine cycle.

It is a further object of the present invention to provide such a microprocessor in which the conditions to be tested may be selected dynamically within the microcode sequence.

It is a further object of the present invention to provide such a microprocessor having the capability of dynamically selecting bits within a condition word for testing according to the condition limit.

It is a further object of the present invention to provide such a microprocessor in which microcoded condition testing may be efficiently implemented within the floating-point microsequencer.

Other objects and advantages of the present invention will be apparent to those of ordinary skill in the art having reference to the following specification together with its drawings.

The present invention may be implemented within a microsequencer, for example the microsequencer associated with a floating-point unit within a microprocessor. Various condition and status information, including control word information, execution results, register contents, and the like are forwarded to a selection circuit within the microsequencer. The microinstruction includes fields for selecting, in a conditional microinstruction, which condition or status is to be tested, the limit against which the condition or status is to be tested, and the type of comparison (e.g., equal, not equal, less than, greater than, etc.). Since the condition information is already present at the microsequencer, the selection and comparison may be performed within a single additional microcode cycle.

DETAILED DESCRIPTION OF THE INVENTION

Figure 1:
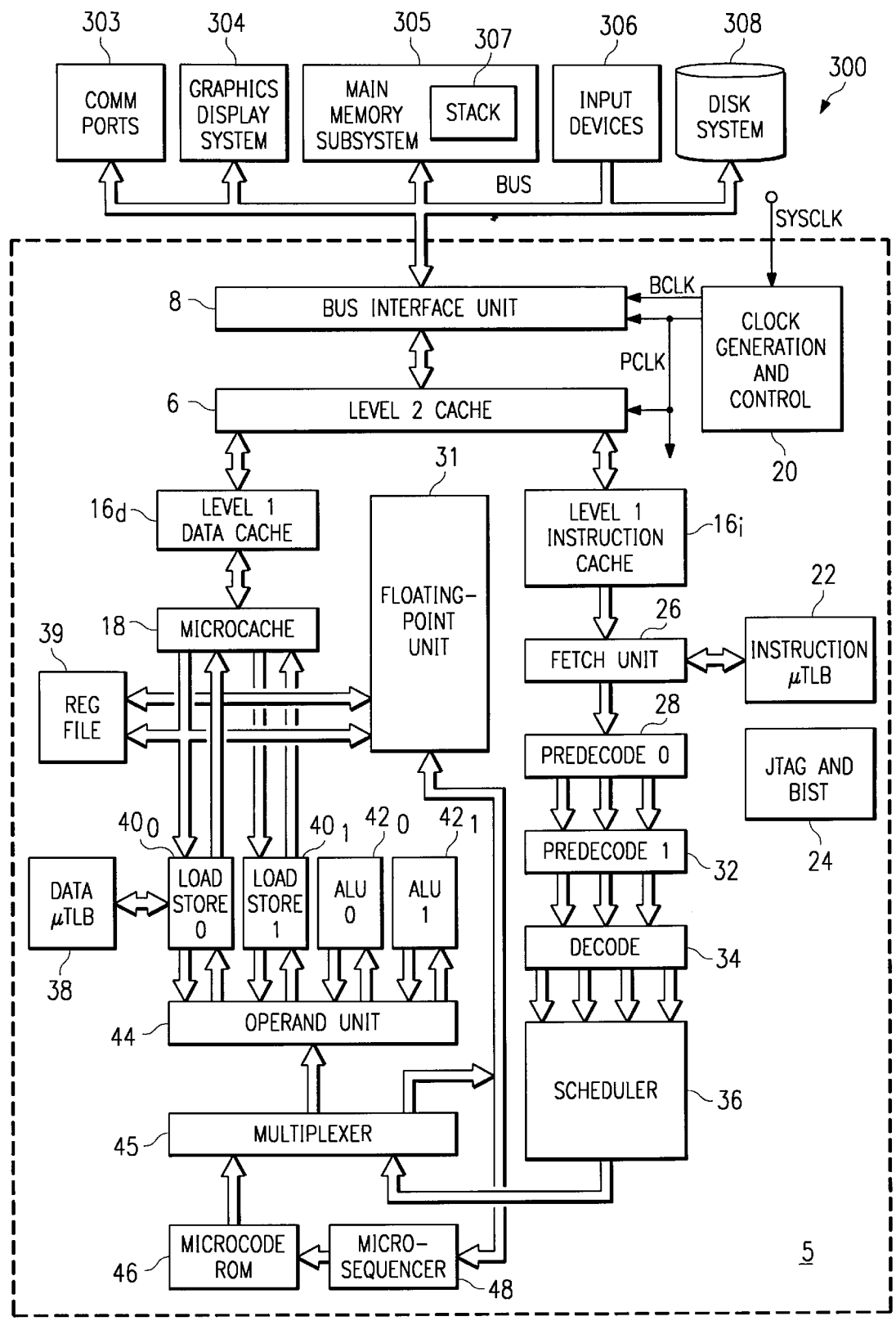
FIG. 1 is an electrical diagram, in block form, of a microprocessor and system constructed according to the preferred embodiment of the invention.

Referring now to FIG. 1, an exemplary data processing system 300, including an exemplary superscalar pipelined microprocessor 5 within which the preferred embodiment of the invention is implemented, will be described. It is to be understood that the architecture of system 300 and of microprocessor 5 is described herein by way of example only, as it is contemplated that the present invention may be utilized in microprocessors of various architectures. It is therefore contemplated that one of ordinary skill in the art, having reference to this specification, will be readily able to implement the present invention in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 5, as shown in FIG. 1, is connected to other system devices by way of external bus BUS. While external bus BUS, in this example, is shown as a single bus, it is of course contemplated that external bus BUS may represent multiple buses having different speeds and protocols, as is known in conventional computers utilizing the PCI local bus architecture. System 300 contains such conventional subsystems as communication ports 303 (including modem ports and modems, network interfaces, and the like), graphics display system 304 (including video memory, video processors, a graphics monitor), main memory system 305 which is typically implemented by way of dynamic random access memory (DRAM) and which may include memory stack 307, input devices 306 (including keyboard, a pointing device, and the interface circuitry therefor), and disk system 308 (which may include hard disk drives, floppy disk drives, and CD-ROM drives). It is therefore contemplated that system 300 of FIG. 1 corresponds to a conventional desktop computer or workstation, as are now common in the art. Of course, other system implementations of microprocessor 5 can also benefit from the present invention, as will be recognized by those of ordinary skill in the art.

Microprocessor 5 includes bus interface unit (BIU) 8 connected to external bus BUS, which controls and effects communication between microprocessor 5 and the other elements in a system 300. BIU 8 includes the appropriate control and clock circuitry to perform this function, including write buffers for increasing the speed of operation, and including timing circuitry so as to synchronize the results of internal microprocessor operation with bus BUS timing constraints. Microprocessor 5 also includes clock generation and control circuitry 20 which generates clock phases based upon system clock SYSCLK; in this example, clock generation and control circuitry 20 generates bus clock BCLK and core clock PCLK from system clock SYSCLK.

Figure 2:
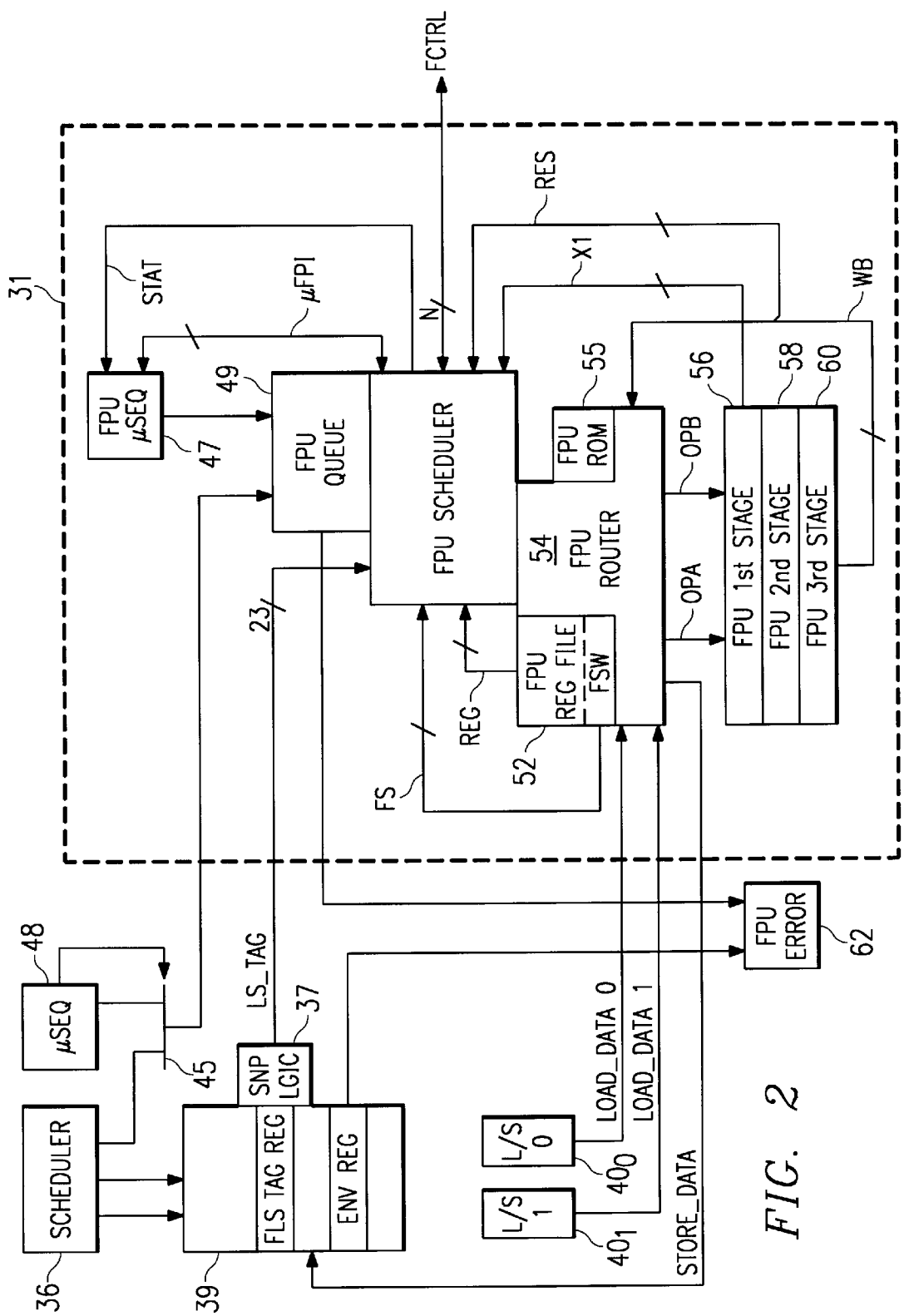
FIG. 2 is an electrical diagram, in block form, of a floating-point unit in the microprocessor of FIG. 1.

As is evident in FIG. 1, microprocessor 5 has three levels of internal cache memory, with the highest of these as level 2 cache 6, which is connected to BIU 8 by way of an internal bus. In this example, level 2 cache 6 is a unified cache, and is configured to receive all cacheable data and cacheable instructions from bus BUS via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 2, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1, microprocessor 5 is of the superscalar type, and thus includes multiple execution units. These execution units include two ALUs $42_0$, $42_1$, for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple pipelines of seven stages each, with write-back. The pipeline stages are as follows:

F Fetch: This stage generates the instruction address and reads the instruction from the instruction cache or memory PD0 Predecode stage 0: This stage determines the length and starting position of up to three fetched x86-type instructions PD1 Predecode stage 1: This stage extracts the x86 instruction bytes and recodes them into fixed length format for decode DC Decode: This stage translates the x86 instructions into atomic operations (AOps)

SC Schedule: This stage assigns up to four AOps to the appropriate execution units (including FPU 31)

OP Operand: This stage retrieves the register operands indicated by the AOps

EX Execute: This stage runs the execution units according to the AOps and the retrieved operands WB Write-back: This stage stores the results of the execution in registers or in memory At least one of these multiple "integer" pipelines operates in combination with the floating-point pipeline of FPU 31, forwarding floating-point instructions thereto from the decode stage.

Referring back to FIG. 1, the pipeline stages noted above are performed by various functional blocks within microprocessor 5. Fetch unit 26 generates instruction addresses from the instruction pointer by way of instruction microtranslation lookaside buffer ($\mu$TLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multibyte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test (BIST) functions, ensuring the validity of the operation of microprocessor 5 upon completion of manufacturing, and upon resets and other events.

Referring now to FIG. 2, the construction of FPU 31 according to this embodiment of the invention, and its interconnection with the other functional blocks of microprocessor 5, will now be described in detail. This construction of FPU 31 is presented by way of example only, as it is to be understood that the present invention will be beneficial in the implementation of floating-point units constructed according to other architectures and designs.

FPU 31 includes FPU queue stage 49, which is effectively an instruction buffer, between the integer portions of microprocessor 5 and the execution stages of FPU 31. FPU queue stage 49 receives FPU instructions from scheduler 36 or from integer microsequencer 48 (in the case of microcoded instructions), via multiplexer 45 that is under the control of microsequencer 48. FPU queue stage 49 also receives FPU instructions from FPU microsequencer 47, for the execution of microcoded FPU instructions.

FPU queue stage 49 is connected to FPU scheduler 50 which, in this example, performs the scheduling function for floating-point instructions separately from scheduler 36 in the integer portion of microprocessor 5. FPU scheduler 50 is logic that operates in similar fashion as scheduler 36, responsive to instructions forwarded thereto from FPU queue stage 49. Register file 39 includes at least one register FLS TAG, which stores the format of data operands that are to be used by FPU 31. Snoop logic 37 is associated with register file 39 to monitor the pipeline for load/store operations corresponding to floating-point instructions, for example as may be stored in register FLS TAG. Snoop logic 37 encodes certain information corresponding to floating-point load/store directives, and forwards this information to FPU scheduler 50 on bus LS_TAG. In response to the floating-point AOps and to the load/store directives, FPU scheduler 50 issues control signals within FPU 31 to execute the instructions communicated thereto.

In this example, FPU 31 includes its own register file 52. Registers included within FPU register file 52 include a floating-point status word (FSW), a floating-point control word (FCW), and an eight-register data stack (consistent with the x86 instruction set). The five floating-point environment registers, useful for interrupt handling, are included in register file 39 (shown in FIG. 2 as ENV REG), as these registers are not used internally by FPU 31.

FPU router 54 operates in conjunction with FPU scheduler 50 to forward the desired operands to the execution stages of FPU 31. FPU router 54 receives floating point operands from multiple sources. Operands retrieved from memory are forwarded to FPU router 54 from load/store units $40_0$, $40_1$, (presenting data on buses LOAD_DATA0, LOAD_DATA1, respectively). FPU router 54 also receives floating-point operands from FPU register file 52, constant data ROM 55, and FPU 3rd execution stage 60 (which presents writeback data from the results of prior instructions). Constant data ROM 55 stores common floating-point constants (e.g., $\pi$, e, $\sqrt{2}$) that may be used in floating-point instruction execution, particularly in transcendental function evaluation and iterative convergence division.

According to this preferred embodiment of the invention, FPU scheduler 50 receives instruction control signals and directives from three sources, namely directives from load/store units 40 on lines LS_TAG, decoded control signals and opcodes from FPU queue stage 49, and address information from writeback bus WB generated by FPU $3^{rd}$ execution stage 60 in response to a single-pass instruction previously launched and executed. Based upon these inputs, FPU scheduler 50 checks for dependencies, or pipeline conflicts, among the resources to which the instructions, control signals and directives point. The source and destination resources to which the floating-point AOps already in the pipeline are recorded and analyzed by FPU scheduler 50 relative to each new instruction or directives in performing this function. FPU scheduler 50 also updates and maintains the machine status, for example by way of a floating-point status word FSW and a floating-point control word FCW.

Status information, including identification of denormalized operands and other exceptions are communicated from the floating-point status word FSW for each floating-point result for storage in FPU error registers 62, via environment registers ENV REG in register file 39 and FPU queue stage 49.

Based on this information, scheduling logic in FPU scheduler 50 determines the operations to be launched for execution in the next cycle. In the event that no dependencies are detected and that the currently scheduled instruction includes a read or write to a register in the stack, FPU scheduler 50 issues commands to FPU register file 52 to validate previously issued enable signals according to the instruction being scheduled, and generates signals to FPU router 54 to select the appropriate operands for forwarding to FPU $1^{st}$ execution stage 56 according to the instruction being launched. Single-pass instructions are initiated by FPU scheduler 50 by control signals to FPU $1^{st}$ execution stage 56.

Depending upon the instruction, FPU scheduler 50 may also initiate a floating-point microcoded sequence by issuing the responsible floating point instruction and a corresponding microcode entry address (on lines μFPI of FIG. 2) to FPU microsequencer 47, which will in turn initiate the microcode routine from the entry address to generate the next sequence of instructions for execution. FPU microsequencer 47 issues and controls floating-point instructions that require multiple passes through FPU execution stages 56, 58, 60, in a manner according to the preferred embodiment of the present invention, as will be described in further detail hereinbelow. Following entry into a microcode sequence, FPU microsequencer 47 presents the sequence of executable instruction codes to FPU queue stage 49, for scheduling and launching by FPU scheduler 50.

In normal operation, where no conflicts or dependencies are detected, a new floating-point instruction will advance through FPU scheduler 50 on every cycle. In the event that a dependency is detected, FPU scheduler 50 will stall the pipeline. The instruction being scheduled at the time of a stall will not proceed, and will be held up until the dependency or exception clears. In the event of a conflict that causes the execution of an earlier instruction to not complete in normal fashion (e.g., prior to execution of an instruction upon a denormal operand, or execution resulting in not-a-number NaN), FPU scheduler 50 will issue an abort sequence, in which case the instructions currently in the floating-point pipeline will be flushed, and the floating-point sequence will be restarted.

FPU scheduler 50 also handles instruction completion, including writeback and update of machine status. In the event of any exceptions resulting from the execution of a floating-point operation, such as NaN (not a number), overflow, underflow, and the like, scheduler 50 is also responsible for handling the exceptions and reporting the exceptions to the integer pipeline by way of floating-point status word FSW, as noted above. Scheduler 50 and router 54 also provide an interface with the integer logic, as is necessitated by the distribution of the scheduling function to FPU 31.

FPU $1^{st}$, $2^{nd}$, and $3^{rd}$ execution stages 56, 58, 60 each include a datapath along which the operands and intermediate results are processed. In addition, each of FPU $1^{st}$, $2^{nd}$, and $3^{rd}$ execution stages 56, 58, 60 also include associated control and status pipelines, along which control signals and status information travel in conjunction with the operands in the corresponding datapath.

FPU $1^{st}$, $2^{nd}$, and $3^{rd}$ execution stages 56, 58, 60 (and, of course, the number of execution stages within FPU 31) may be constructed according to conventional techniques for floating-point units. According to this preferred embodiment of the invention, the datapath of FPU $1^{st}$ execution stage 56 receives operands OPA and OPB are received from router 54, and includes three parallel arithmetic paths for effecting arithmetic operations. One arithmetic path within FPU $1^{st}$ execution stage 56 handles the exponents of floating-point operands OPA and OPB, a second arithmetic path aligns the mantissas of operands OPA and OPB for add and subtract instructions, and a third arithmetic path multiplies operands OPA and OPB for multiply and divide instructions. FPU $2^{nd}$ execution stage 58 receives and further aligns and adjusts the exponent operands from FPU $1^{st}$ execution stage 56; in addition, FPU $2^{nd}$ execution stage 58 includes an adder for adding either the aligned mantissas or the product operands (in sum and carry form) from FPU $1^{st}$ execution stage 56, depending upon whether the instruction is an addition or subtraction. FPU $3^{rd}$ execution stage 60 receives the exponent and mantissa results from FPU $2^{nd}$ execution stage 58, and performs such operations as normalizing and rounding the results, generating the appropriate sign bit for the result, and applying constants from a "quick ROM" to represent results such as indefinite QNaN, zero, infinity (±), π and common fractions of π, and the largest representable number in each available precision format. The output from FPU $3^{rd}$ execution stage 60, upon completion of one pass in the performance of a floating-point instruction, are forwarded on writeback bus WB to FPU router 54 for storage in a register in FPU register file 52, storage in memory, or other handling.

As shown in FIG. 2, a portion (bus RES) of writeback bus WB is forwarded to FPU scheduler 50. In addition, bus REG from FPU register file 52, bus FS from floating-point status word FSW, and bus X1 from FPU $1^{st}$ execution stage 56 are similarly forwarded to FPU scheduler 50. These buses are examples of buses within microprocessor 5 that convey status information for interrogation by FPU microsequencer 47 in the conditional program flow of a microcoded sequence, as these buses carry results of operations performed by microprocessor 5 in carrying out the program, specifically in carrying out a microcoded floating-point sequence under the control of FPU microsequencer 47. FPU scheduler 50 in turn forwards the status values communicated on these buses RES, REG, FS, X1, and any other such buses as are useful in the conditional flow of microprograms, to FPU microsequencer 47 by way of status bus STAT. Routing of the various status values and status buses RES, REG, FS, X1 (and others) through FPU scheduler 50 as shown in FIG. 2 is preferred, according to this embodiment of the invention, because the individual status values to be interrogated by FPU microsequencer 47 may be generated at different times within the machine cycle. This routing permits FPU scheduler 50 to latch these status values as received, and present them simultaneously to FPU microsequencer 47, for convenience of coding. Alternatively, buses RES, REG, FS, X1 and the like may be directly routed to FPU microsequencer 47, if desired.

Figure 3:
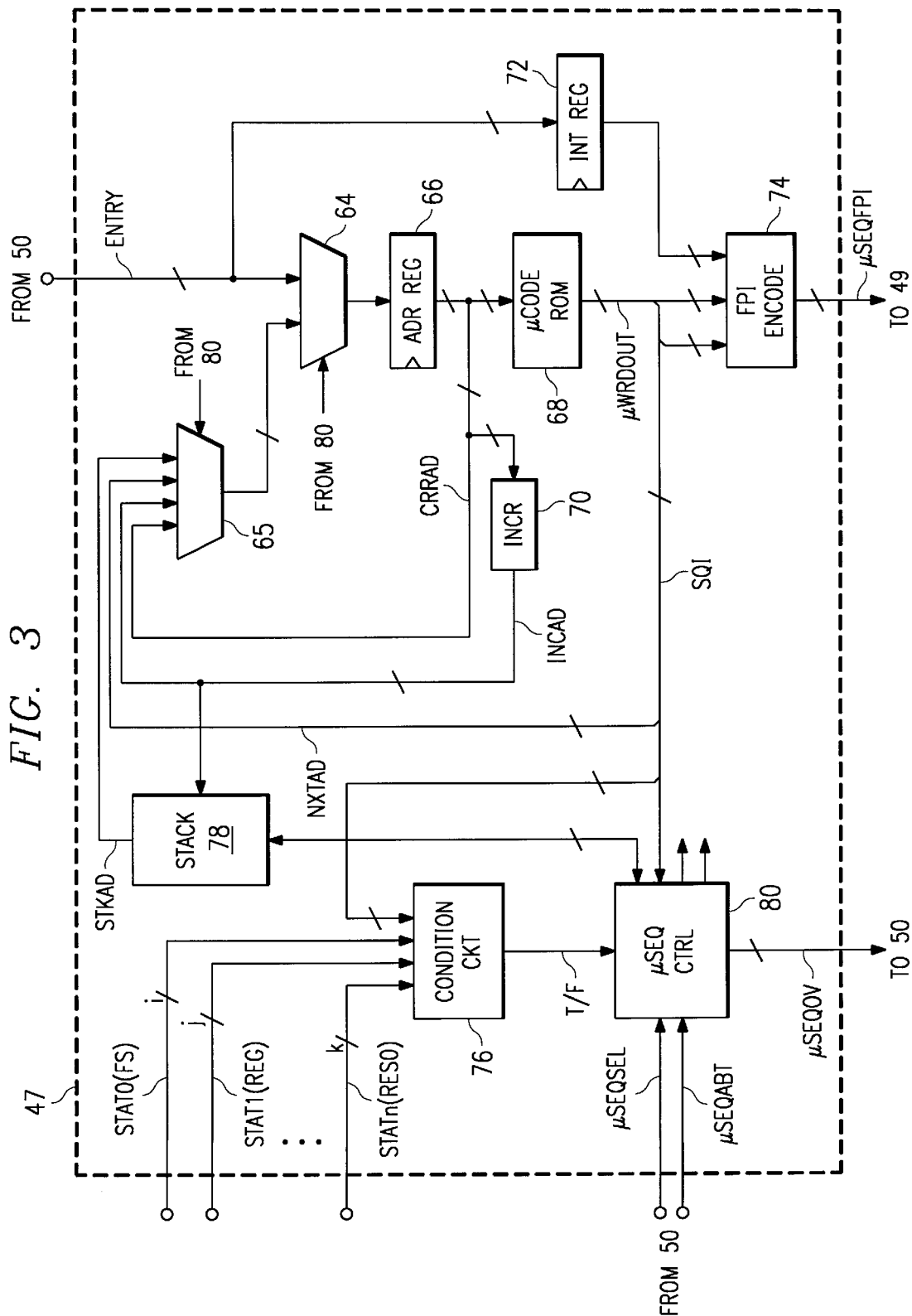
FIG. 3 is an electrical diagram, in block form, of the microsequencer in the floating-point unit of FIG. 2 according to the preferred embodiment of the invention.

Referring now to FIG. 3, the construction and operation of FPU microsequencer 47 will now be described in detail. As shown in FIG. 3, FPU microsequencer 47 includes address multiplexer 64 which receives a microcode entry address from FPU scheduler 50 upon lines ENTRY; lines ENTRY are a portion of lines μFPI illustrated in FIG. 2. Address multiplexer 64 also receives a next address value from multiplexer 65 and, under the control of microsequence control circuitry 80, selects an address for storage in address register 66. Some or all of lines ENTRY, particularly those corresponding to parameters to be passed to the microcode sequence, are also applied to and stored within initialization register 72, for use in generating the actual floating-point instructions generated by FPU microsequencer 47.

The output of address register 66 is applied to microcode ROM 68, which is a conventional read-only memory as used in microcontrollers. Microcode ROM 68 stores a microinstruction, or microword, in association with each address, which it presents upon lines μWRDOUT at its output responsive to receiving the corresponding address. As typical in the art, microinstructions are relatively wide words containing bits corresponding to control signals to be applied to operational circuitry. In this example, where FPU microsequencer 47 is contained within FPU 31, the microinstructions generated by microcode ROM 68 on lines μWRDOUT are applied to FPI encoder 74. A portion of the microinstruction corresponds to sequencer information (i.e., is not used for execution by FPU 31 but instead pertains to control of FPU microsequencer 47 itself), and is presented on lines SQI, a portion of which are applied to stack 78, to microsequencer control 80, and, on lines NXTAD, to an input of multiplexer 65. FPI encoder 74, in addition to the microinstruction on lines μWRDOUT, also receives bits from the entry address stored in initialization register 72, along with sequence information from lines SQI generated by microcode ROM 68. FPU encoder 74 includes formatting circuitry for applying the microinstruction as a floating-point instruction, in combination with some amount of logic circuitry for generating addresses for FPU ROM 55 when applicable. FPU encoder 74 combines the additional information along with the microinstruction to generate a corresponding floating-point instruction on lines μSEQFPI, which are applied to FPU queue 49 for eventual scheduling and execution.

As noted above, multiplexers 64 and 65 generate the address to be stored in address register 66 and to be applied to microcode ROM 68. FPU microsequencer 47 according to this embodiment of the invention is of the branch-always architecture, in which the next address to be applied to microcode ROM 68 is selected from a set of four possibilities. The current address at the output of address register 66 is forwarded, on lines CRRAD, to one input of multiplexer 65, and to incrementing circuitry 70. Incrementing circuitry 70 adds one to the address value on lines CRRAD and presents the incremented value on lines INCAD to a second input of multiplexer 65. As noted above, the microinstruction accessed from microcode ROM 68 itself includes sequence information on lines SQI, including a next address value on lines NXTAD that is applied to a third input of multiplexer 65. The fourth input to multiplexer 65 is generated by four-deep stack 78, which stores state information useful in microcode subroutine calls and returns, including parameters to be passed to the subroutines and also return microcode addresses. As such, the address value generated by stack 78 on lines STKAD and applied to multiplexer 65 typically corresponds to a microprogram subroutine return address.

Multiplexers 64, 65 are under the control of microsequencer control 80, which is control circuitry that operates FPU microsequencer 47 in the desired manner. Microsequencer control 80 receives signals from FPU scheduler 50 on lines μSEQSEL and μSEQABT (corresponding to some of lines μFPI in FIG. 2), to initiate and abort microcode sequences, respectively. Microsequencer control 80 generates a control signal to FPU scheduler 50 on line μSEQOV, which indicates that FPU microsequencer 47 has assumed control of FPU 31, such as occurs in the operation of a microsequence as will be described in further detail hereinbelow. Microsequencer control 80 controls multiplexer 64 to select from between the entry address on lines ENTRY upon receipt of a new signal on line μSEQSEL, and the next address from multiplexer 65 once within a microcode sequence. Microsequencer control 80 also controls multiplexer 65 to select the next microcode address from among the current address on lines CRRAD (e.g., in a stall condition), the next sequential address on lines INCRAD (e.g., in performing a non-branching portion of a microcode sequence), an address indicated by the microinstruction itself on lines NXTAD (e.g., in performing a branch or jump, either unconditionally, or conditionally as will be described hereinbelow), and a stack address on lines STKAD (e.g., in performing a return from a microcode subroutine). Microsequencer control 80 controls multiplexer 65 in response to the microinstructions generated by microcode ROM 68, in response to external signals, in response to signals indicated by stack 78, and also, according to this embodiment of the invention, in response to condition testing results generated by condition circuitry 76 and indicated on line T/F, as will be described in further detail hereinbelow.

The general operation of FPU microsequencer 47 will now be described relative to FIG. 3. Prior to the initiation of a microsequence (i.e., line μSEQSEL not asserted by FPU scheduler 50), microcode ROM 68 will be cycling through a sequence of no-operation codes (NOPs). In this condition, the current address in address register 66 will store the address of a microcode NOP; in each cycle, this address will be applied to microcode ROM 68, which in turn will generate the NOP microinstruction on lines μWRDOUT. The NOP microinstruction indicates, to microsequencer control 80 on lines SQI, that the same address is to be presented to microcode ROM 68 in the next cycle; microsequencer control 80 in turn controls multiplexer 65 to select the current address on lines CRRAD and controls multiplexer 64 to select the output of multiplexer 65 for storage in address register 66 and application to microcode 68 in the next cycle, continuing the cycle of microcode NOPs.

Initiation of a microcode sequence begins with FPU scheduler 50 receiving an instruction corresponding to a floating-point microcode sequence. Examples of such instructions, in this embodiment of the invention, include operations such as division, transcendental and trigonometric function evaluation, and the like. FPU scheduler 50 launches the microcode sequence by applying a microcode entry address on lines ENTRY and by asserting line μSEQSEL. Microsequencer control 80 in FPU microsequencer 47, in response to the signal on line μSEQSEL, controls multiplexer 64 to select lines ENTRY for storage in address register 66 as the next microcode address, and also controls initialization register 72 to store the appropriate portions of the entry address therein. The entry address is then applied to microcode ROM 68, which accesses the corresponding microinstruction and presents the same on lines μWRDOUT to FPI encoder 74. FPI encoder 74 then generates the appropriate floating-point instruction on lines μSEQFPI, which is applied to FPU queue 49 for eventual launching and execution by FPU 31 in the programmed manner. Microsequencer control 80 asserts a signal on line μSEQOV, acknowledging to FPU scheduler 50 that FPU 31 is under the control of a microcode sequence emanating from FPU microsequencer 47.

The microcode sequence continues with microsequencer control 80 controlling multiplexer 65 to select the next address to be applied to microcode ROM 68, according to the execution of the microcode sequence. As noted above, sequential microprogram control is effected by multiplexer 65 applying the incremented address on lines INCAD; branches and jumps are effected by multiplexer 65 selecting the destination address indicated by the microinstruction on lines NXTAD, or selecting a return address from stack 78 as presented on lines STKAD. Execution continues in this manner, until either the microsequence is aborted (FPU scheduler 50 asserting line $\mu$SEQABT), or until the microprogram is complete (reaching a NOP sequence as before); in either case, microsequencer control 80 deasserts the signal on line $\mu$SEQOV, releasing its control of FPU 31. According to the preferred embodiment of the invention, conditional branching is controlled by microsequencer control 80 responsive to the results of condition testing communicated on line T/F from condition circuitry 76, as will now be described.

Condition circuitry 76 according to this embodiment of the invention receives multiple condition or status fields from elsewhere in FPU 31 and in microprocessor 5, as shown in FIG. 3 by buses STAT0 through STATn, which collectively correspond to bus STAT forwarded by FPU scheduler 50 to FPU microsequencer 47 as shown in FIG. 2. As will become apparent hereinbelow, the number of these buses STAT0 through STATn may, according to this embodiment of the invention, be quite large without substantially increasing microword width. The nature of the information communicated on buses STAT0 through STATn may vary widely. For example, as shown in FIGS. 2 and 3, bus STAT0 may communicate the status value of bus FS and thus receive a portion of floating-point status word FSW, bus STAT1 may communicate the status value on bus REG and thus receive a portion of the contents of a register in FPU register file 52 on lines REG, and bus STATn may the status value on bus RES from FPU $3^{rd}$ execution stage 60 and thus receive a portion of the results of a floating-point instruction. It is particularly contemplated, relative to the forwarding of results from FPU $3^{rd}$ execution stage 60, that multiple ones of buses STAT0 through STATn may receive different portions of the result. For example, one bus STATi may receive a portion of the exponent result from FPU $3^{rd}$ execution stage 60, another bus STATj may receive a portion of the mantissa result from FPU $3^{rd}$ execution stage 60, and yet another bus STATk may receive sign, status and other information regarding this result. In general, it is contemplated that the type of information applied to condition circuitry 76 of FPU microsequencer 47 is not limited in type or amount, but may include such information within microprocessor 5 (not merely within FPU 31) that the microprogrammer may find to be useful in generating microcode sequences for use by FPU 31, in this example.

Figure 4:
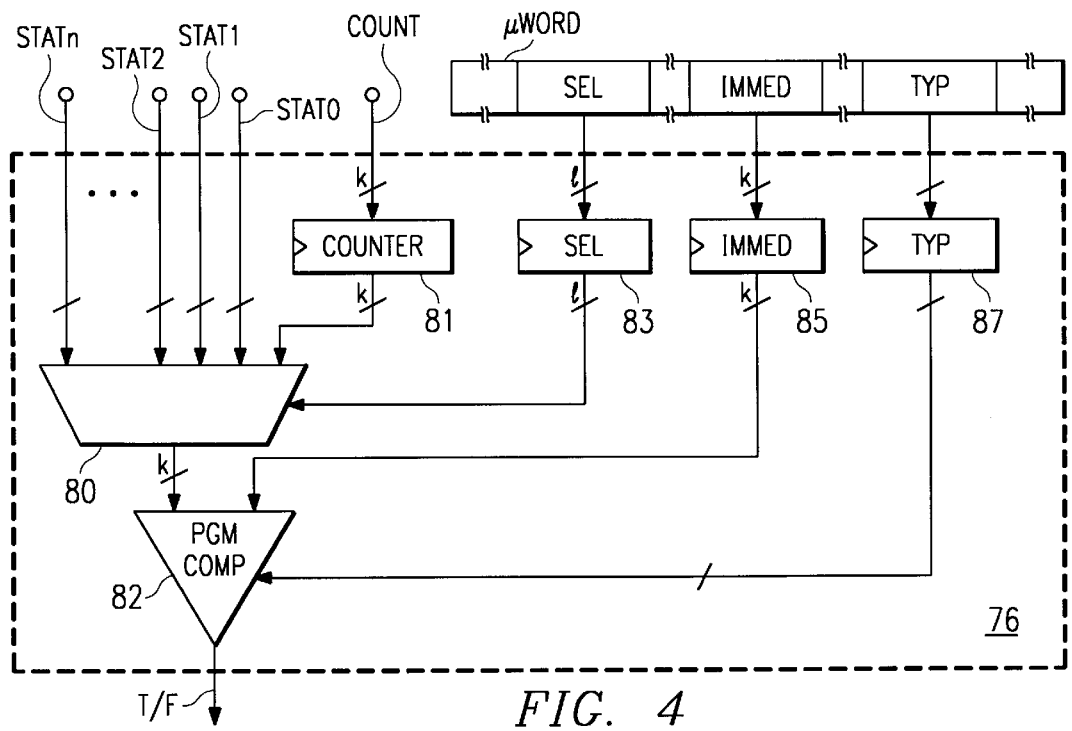
FIG. 4 is an electrical diagram, in block form, of the condition circuitry in the microsequencer in the floating-point unit of FIG. 2 according to a first embodiment of the invention.

Referring now to FIG. 4, the construction and operation of condition circuitry 76 according to a first embodiment of the invention will now be described in detail. As shown in FIG. 4, condition circuitry 76 includes multiplexer 80, which receives buses STAT0 through STATn at its inputs, each including k or fewer conductors; in this example, each of buses STAT0 through STATn are eight bits or fewer in width (i.e., k=8). Condition circuitry 76 also includes counter 81, which receives a k-bit value on lines COUNT from lines SQI, which allows the value of counter 81 to be set by way of a microinstruction. Counter 81 is contemplated for use primarily as a loop counter, its contents compared in each pass of a program loop to determine if the desired number of passes have been executed. The value of counter 81 is presented to another input of multiplexer 80.

The output of multiplexer 80, which corresponds to the selected one of buses STAT0 through STATn or counter 81 is presented as k bits to one input of a programmable comparator 82. Multiplexer 80 preferably includes circuitry for adding "0" logic states to those of buses STAT0 through STATn having fewer than k bits. Programmable comparator 82 is operable to perform a binary comparison of the k-bit value presented from multiplexer 80 against another value presented to its second input (as will be described hereinbelow) and to generate a signal on line T/F at its output. Comparator 82, according to this embodiment of the invention, is controllable to perform one of a set of various comparisons, the set including arithmetic comparisons such as equality, inequality (less than, greater than, not equal to), and combinations thereof (e.g., less than or equal to).

As shown in FIG. 4, microinstruction $\mu$WORD is presented by microcode ROM 68 in the current microprogram, in response to an address presented thereto. In this embodiment of the invention, microinstruction $\mu$WORD includes, in its portion presented on lines SQI as shown in FIG. 3, fields SEL, IMMED, and TYP for controlling the operation of multiplexer 80 and comparator 82 in condition circuitry 76. Field SEL of the microinstruction $\mu$WORD is a group of bits that indicate the one of the inputs to multiplexer 80 to be selected for comparison; the state of field SEL is stored in register 83, the contents of which are applied to the control inputs of multiplexer 80. The number of bits of field SEL directly determine the maximum number of inputs available to multiplexer 80. In condition circuitry 76 of FIG. 4, field SEL (and register 83) is l bits in width, such that the number of inputs of multiplexer 80 is, at a maximum, $2^l$. For example, in the case where field SEL and register 83 are each three bits in width (i.e., l=2) multiplexer 80 may receive eight bus inputs; in this case, up to seven buses STAT0 through STAT6 plus counter 81 may be coupled to multiplexer 80.

Another field of the microinstruction $\mu$WORD is field IMMED. Field IMMED is a k-bit value that is stored in register 85, and applied to the second input of programmable comparator 82 for comparison against the k-bit output of multiplexer 80, corresponding to the input bus selected by field SEL to be compared for this microinstruction $\mu$WORD. In this example, the number of bits in field IMMED and in register 85, as well as the number of bits for each of the buses STAT0 through STATn and of counter 81, is eight. As noted above, buses STAT0 through STATn may each be k (e.g., eight) bits or less in width. For those buses STAT0 through STATn which are less than k bits in width, multiplexer 80 is preferably constructed to provide hard-wired "0" states for the excess bits for use by programmable comparator 82.

Microinstruction $\mu$WORD includes a third field TYP that indicates the type of comparison to be performed by programmable comparator 82 in connection with that microinstruction. It is contemplated that the types of comparison permitted include equality, inequality (less than, greater than, not equal to), and combinations of the same; in addition, other types of comparison may be included within the capability of programmable comparator 82 and selected by field TYP of microinstruction $\mu$WORD. The number of bits of field TYP will, of course, depend upon the number of types of comparison desired.

In operation, according to this first preferred embodiment of the invention, comparison of any one of the status or conditions on buses STAT0 through STATn (or in counter 81) may be made within two cycles. In a first cycle, microinstruction $\mu$WORD is issued by microcode ROM 68 in response to the corresponding address, including valid values for the fields SEL, IMMED, and TYP. The states of these three fields are stored in registers 83, 85, 87, respectively. Also in this first cycle, the state of field SEL in register 83 is applied to the control inputs of multiplexer 80 to apply the status value on the selected one of buses STAT0 through STATn or counter 81, as the case may be, to the first input of programmable comparator 82. The state of field IMMED is stored in register 85 and applied to the second input of comparator 82. The field TYP is stored in register 87 and applied to programmable comparator 82 to configure comparator 82 in the appropriate manner for the desired operation.

In the second cycle, according to this embodiment of the invention, programmable comparator 82 performs the comparison of the output of multiplexer 80 with the contents of register 85, namely the field IMMED, according to the comparison type selected by field TYP of microinstruction μWORD. Based upon the result of this comparison, programmable comparator 82 issues a signal on line T/F, for example by asserting the signal if the comparison is true, and deasserting the signal if the comparison is false.

Microsequencer control 80 (FIG. 3) receives the signal on line T/F and controls multiplexer 64 accordingly to effect a conditional branch. For example, if microinstruction μWORD is a conditional branch (i.e., branching if the condition tested is true), upon receipt of an asserted signal on line T/F, microsequencer control 80 will cause multiplexer 64 to select the state of lines NXTAD (i.e., the destination address specified in microinstruction μWORD) as the next microcode address to be stored in address register 66 and applied to microcode ROM 68. Conversely, if the condition is false as indicated by an unasserted signal on line T/F, microsequencer control 80 will cause multiplexer to select the next sequential address on lines INCAD for storage in address register 66 and application to microcode ROM 68. The progress of the microsequence then continues based upon the particular microprogram.

Because of registers 83, 85, 87, new states of fields SEL, IMMED, and TYP may be received from a new microinstruction in this same second cycle in which the comparison is made by programmable comparator 82, so that another comparison may be made in the ensuing (third) cycle. If no new values for fields SEL, IMMED, and TYP are specified in the next instruction, the prior values stored in registers 83, 85, 87 will remain for the next comparison.

According to this embodiment of the invention, therefore, microinstruction μWORD of reasonable width may perform a wide range of comparison types, upon a wide range of possible state or condition information as provided on buses STAT0 through STATn, in an efficient manner. The comparison is made within FPU microsequencer 47, eliminating the need to execute long microcode sequences to perform the same condition testing. In addition, the microcode sequence is able to dynamically select the conditions to be tested from cycle to cycle, again without requiring either an extremely wide microinstruction or a long sequence of microinstructions.

Figure 5:
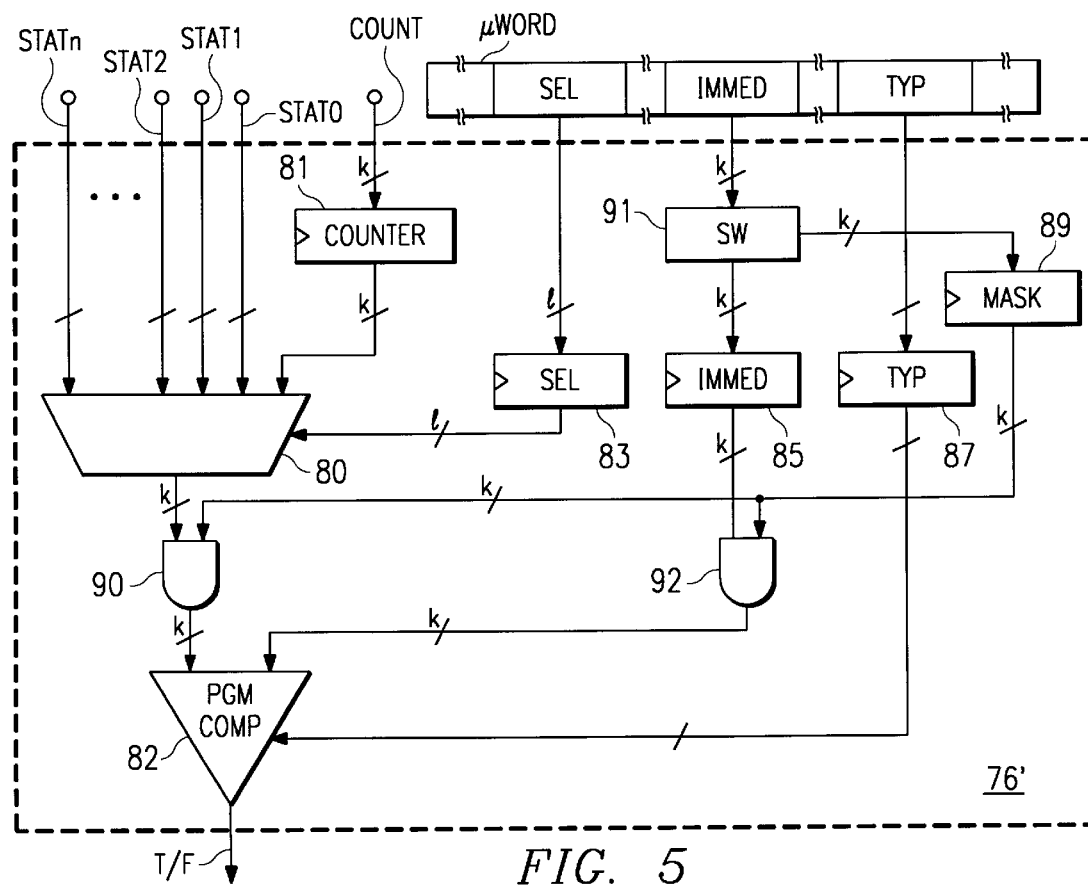
FIG. 5 is an electrical diagram, in block form, of the condition circuitry in the microsequencer in the floating-point unit of FIG. 2 according to an alternative embodiment of the invention.

Referring now to FIG. 5, the construction and operation of condition circuitry 76' according to a second embodiment of the invention will now be described. Like elements in condition circuitry 76' as those in condition circuitry 76 described above will be referred to by the same reference numerals as those used in FIG. 4. As in condition circuitry 76, condition circuitry 76' according to this second embodiment of the present invention includes multiplexer 80 receiving sets of inputs from buses STAT0 through STATn and from counter 81, registers 83, 85, 87 for receiving fields SEL, IMMED, and TYP from microinstruction μWORD, and programmable comparator 82 for making the comparison indicated by the state of field TYP as stored in register 87.

According to this embodiment of the invention, however, condition circuitry 76' includes mask capability, so that the comparison performed by programmable comparator 82 may be restricted to selected bits of the condition selected by multiplexer 80 and the same bits of field IMMED. As shown in FIG. 5, register 89 is provided in control circuitry 76' to receive a field MASK from a portion of a preceding microinstruction. In this embodiment of the invention, field IMMED is coupled to switch 91, which selectively forwards field IMMED either to register 85 as before, or to mask register 89, depending upon a control bit (not shown) in microinstruction μWORD. The field MASK is k bits in width, identical to the width of field IMMED and to the selected condition field at the output of multiplexer 80. The output of register 89 is applied to an input of each of AND function 90 and AND function 92. AND function 90 receives the output of multiplexer 80 at another input, and has its output connected to an input of programmable comparator 82; similarly, AND function 92 receives field IMMED from the output of register 85 at its other input, and has its output connected to a second input to programmable comparator 82. In this way, programmable comparator 82 compares the respective outputs of AND functions 90, 92 in determining the condition result.

In operation, condition circuitry 76' typically requires an additional cycle to receive the state of field MASK in register 89. Accordingly, in a first cycle, microinstruction μWORD includes a mask value in field IMMED, and controls switch 91 to apply the value of field IMMED to register 89 for storage therein as field MASK. In a second cycle, microinstruction μWORD applies the current value of its fields SEL, IMMED, TYP, to registers 83, 85, 87 respectively. Also in this second cycle, as described above, the value of field SEL in register 83 controls multiplexer 80 to select the desired bus for comparison, by application to AND function 90 along with the field MASK from register 89, and the value of field IMMED from register 85 is applied in to AND function 92, also along with the field MASK. Those bits of the output of multiplexer 80 and field IMMED that correspond to the bits of field MASK that are set to "1", are passed by AND functions 90, 92 to programmable comparator 82 for comparison, according to the comparison type selected by the value of field TYP in register 87. AND functions 90, 92 utilize the bit positions of field MASK that are set to "0" to block, from comparison at programmable comparator 82, the corresponding bits of the output of multiplexer 80 and field IMMED. In a third cycle, programmable comparator 82 performs the desired comparison of the selected one of buses STAT0 through STATn or counter 81 with the value of field IMMED, both masked according to the state of field MASK in register 89, and sets the state of control line T/F accordingly, for communication to microsequencer control 80. Microsequencer control 80 then controls multiplexer 65 in response to the result of the condition test performed by condition circuitry 76', as before.

Further in the alternative, condition circuitry 76' may be constructed so that register 89 receives a separate field MASK (i.e., separate from fields SEL, IMMED, and TYP) from microinstruction μWORD, rather than by way of switch 91. According to this alternative construction, register 89 may be loaded with field MASK in parallel with registers 83, 85, 87 receiving fields SEL, IMMED, TYP, respectively, eliminating the need for an additional microinstruction cycle, at a cost of a slightly wider microword width.

In either case, use of the field MASK according to this embodiment of the invention provides additional flexibility in the comparison of conditions within FPU microsequencer 47, at the cost of either an additional microcode cycle or of additional width in the microcode word.

According to each of the above-described embodiments of the invention, improved flexibility in the structure and execution of microprograms within a microprocessor is provided, without requiring large increases in the size of the microcode ROM to accommodate a large number of fields, or to accommodate longer microinstruction sequences necessary to control circuitry external to the microcontroller to perform the desired status or condition comparison. While these benefits are provided in the above-described embodiments of the invention which pertain to the microsequencer within a floating-point unit, it will be understood by those of ordinary skill in the art that the same techniques may be applied to microcontrollers in other locations within microprocessors, for example in the microsequencer 48 for the integer pipeline of microprocessor 5 described hereinabove. It is further contemplated that the present invention may also be applied to microprocessors and microcoded logic devices of other architectures, and that therefore the above description is provided only by way of example.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A microsequencer in a microprocessor integrated circuit, comprising:

a microcode ROM, for storing microinstructions, and for presenting a selected microinstruction responsive to receiving a microcode address;

condition circuitry, coupled to the microcode ROM to receive at least a portion of a microinstruction therefrom, and having a plurality of inputs for receiving a plurality of status values from circuitry in the microprocessor, said condition circuitry for comparing an immediate field in a microinstruction from the microcode ROM with one of the plurality of status values selected responsive to a select field in the microinstruction, and for generating a condition signal corresponding to the result of the comparison; and microsequencer control circuitry, coupled to the condition circuitry and to microcode ROM, for applying a selected microcode address to the microcode ROM responsive to the condition signal.

2. The microsequencer of claim 1, wherein the microsequencer control circuitry comprises:

an address multiplexer, having a first input coupled to an address input of the microcode ROM to receive a current address value, having a second input receiving an incremented address value, having a third input coupled to the output of the microcode ROM to receive a next address field from the microinstruction, and having an output coupled to the address input of the microcode ROM; and control circuitry, having an input coupled to the condition circuitry to receive the condition signal, and having an output coupled to a control input of the address multiplexer.

3. The microsequencer of claim 2, wherein the microsequencer control circuitry further comprises:

an entry address multiplexer, having a first input coupled to the output of the address multiplexer, having a second input coupled to receive an entry address, and having an output coupled to the address input of the microcode ROM;

wherein the control circuitry has another input coupled to receive a microcode entry select signal, and has an output coupled to a control input of the entry address multiplexer, for controlling the entry address multiplexer to apply the entry address to the address input of the microcode ROM responsive to receiving the microcode entry select signal.

4. The microsequencer of claim 1, wherein the condition circuitry comprises:

a multiplexer, having a plurality of inputs, each receiving one of the plurality of status values, having a control input coupled to receive the select field in the microinstruction, and having an output; and a comparator having a first input coupled to the output of the multiplexer, having a second input coupled to receive the immediate field in the microinstruction, and having an output for presenting the condition signal to the microsequencer control circuitry responsive to a comparison between values applied to its first and second inputs.

5. The microsequencer of claim 4, wherein the comparator is of a programmable type and capable of performing comparisons of a plurality of types, and has a control input coupled to receive a type field from the microinstruction, the value of the type field controlling the comparator to perform a comparison of a selected type.

6. The microsequencer of claim 4, wherein the condition circuitry further comprises:

a first mask circuit, having a first input coupled to the output of the multiplexer, having a second input coupled to receive a mask field from a microinstruction, and having an output coupled to the first input of the comparator, for forwarding to the comparator a selected subset of bits of the output of the multiplexer corresponding to the value of the mask field; and a second mask circuit, having a first input coupled to receive the immediate field from the microinstruction, having a second input coupled to receive the mask field, and having an output coupled to the second input of the comparator, for forwarding to the comparator a selected subset of bits of the immediate field corresponding to the value of the mask field.

7. The microsequencer of claim 6, wherein the condition circuitry further comprises:

a select field register, having an input coupled to receive the select field from the microinstruction and having an output coupled to the control input of the multiplexer;

an immediate field register, having an input coupled to receive the immediate field from the microinstruction and having an output coupled to the first input of the second mask circuit;

a type field register, having an input coupled to receive the type field from the microinstruction, and having an output coupled to the control input of the comparator; and a mask field register, having an input coupled to receive the mask field from the microinstruction, and having an output coupled to the second input of each of the first and second mask circuits.

8. The microsequencer of claim 7, wherein the condition circuitry further comprises:
a field switch, having an input coupled to receive the immediate field from the microinstruction, for forwarding the immediate field of a first microinstruction to the input of the mask field register, and for forwarding the immediate field of a second microinstruction to the input of the immediate field register.

9. The microsequencer of claim 5, wherein the condition circuitry further comprises:
a select field register, having an input coupled to receive the select field from the microinstruction and having an output coupled to the control input of the multiplexer;
an immediate field register, having an input coupled to receive the immediate field from the microinstruction and having an output coupled to the second input of the comparator; and
a type field register, having an input coupled to receive the type field from the microinstruction, and having an output coupled to the control input of the comparator.

10. The microsequencer of claim 1, wherein the condition circuitry comprises:
a counter, for storing a count value;
a multiplexer, having a plurality of inputs, one of which is coupled to the counter to receive the count value therefrom, and each of the other of the plurality of inputs coupled to receive one of the plurality of status values, having a control input coupled to receive the select field in the microinstruction, and having an output;
a comparator having a first input coupled to the output of the multiplexer, having a second input coupled to receive the immediate field in the microinstruction, and having an output for presenting the condition signal to the microsequencer control circuitry responsive to a comparison between values applied to its first and second inputs.

11. A method of operating a microsequencer in a microprocessor to control the execution of a microcode sequence, comprising the steps of:
applying a first microcode address to a microcode ROM to retrieve a first microinstruction therefrom;
receiving a plurality of status values from circuitry in the microprocessor;
selecting one of the plurality of status values responsive to a select field in the first microinstruction, and applying the selected one of the plurality of status values to a first input of a comparator;
applying an immediate field from the first microinstruction to a second input of the comparator;
operating the comparator to compare its first and second inputs and to generate a condition signal responsive thereto; and
applying a second microcode address to the microcode ROM, the second microcode address selected responsive to the condition signal.

12. The method of claim 11, wherein the comparator is a programmable comparator, operable to perform a selected one of a plurality of comparisons responsive to a control signal applied thereto;
and further comprising:
applying a control signal to the comparator responsive to a type field in the first microinstruction.

13. The method of claim 11, further comprising:
masking the selected one of the plurality of status values responsive to a mask field in a microinstruction, so that the masked selected status value is applied to the first input of the comparator;
masking the immediate field of the first microinstruction responsive to the mask field, so that the masked immediate field is applied to the second input of the comparator.

14. The method of claim 13, further comprising:
prior to the step of applying a first microcode address to the microcode ROM, applying a third microcode address to the microcode ROM to retrieve a third microinstruction therefrom, the third microinstruction containing the mask field; and
storing the mask field in a mask field register.

15. The method of claim 11, wherein the step of applying a second microcode address to the microcode ROM comprises:
incrementing the first microcode address;
applying the incremented first microcode address to a first input of an address multiplexer, the address multiplexer having an output coupled to the microcode ROM;
applying a next address field of the first microinstruction to a second input of the address multiplexer; and
controlling the address multiplexer to select the incremented first microcode address responsive to the condition signal being in a first state, and to select the next address field of the first microinstruction responsive to the condition signal being in a second state.

16. A microprocessor, comprising:
an execution unit, coupled to receive operands, for executing operations upon the operands to generate a result;
an instruction scheduler, for decoding and applying control signals to the execution unit corresponding to program instructions; and
a microsequencer, coupled to the instruction scheduler, comprising:
a microcode ROM, for storing microinstructions, and for presenting a selected microinstruction responsive to receiving a microcode address;
condition circuitry, coupled to the microcode ROM to receive at least a portion of a microinstruction therefrom, and having a plurality of inputs for receiving a plurality of status values from the execution unit, said condition circuitry for comparing an immediate field in a microinstruction from the microcode ROM with one of the plurality of status values selected responsive to a select field in the microinstruction, and for generating a condition signal corresponding to the result of the comparison; and
microsequencer control circuitry, coupled to the instruction scheduler to initiate a microcode sequence responsive to control signals received therefrom, and coupled to the condition circuitry and to the microcode ROM of the microsequencer, for applying a selected microcode address to the microcode ROM responsive to the condition signal.

17. The microprocessor of claim 16, wherein one of the plurality of status values comprises a portion of the result from the execution unit.

18. The microprocessor of claim 16, wherein one of the plurality of status values comprises a portion of a status word from the execution unit.

19. The microprocessor of claim 16, wherein the microsequencer control circuitry comprises:

an address multiplexer, having a first input coupled to an address input of the microcode ROM to receive a current address value, having a second input receiving an incremented address value, having a third input coupled to the output of the microcode ROM to receive a next address field from the microinstruction, and having an output coupled to the address input of the microcode ROM;

an entry address multiplexer, having a first input coupled to the output of the address multiplexer, having a second input coupled to receive an entry address from the instruction scheduler, and having an output coupled to the address input of the microcode ROM; and control circuitry, having an input coupled to the condition circuitry to receive the condition signal, having another input coupled to receive a microcode entry select signal from the instruction scheduler, and having an output coupled to a control input of the address multiplexer and to the entry address multiplexer, for controlling the address multiplexer responsive to the condition signal, and for controlling the entry address multiplexer to apply the entry address to the address input of the microcode ROM responsive to receiving the microcode entry select signal.

20. The microprocessor of claim 16, wherein the condition circuitry comprises:

a multiplexer, having a plurality of inputs, each receiving one of the plurality of status values, having a control input coupled to receive the select field in the microinstruction, and having an output; and a comparator having a first input coupled to the output of the multiplexer, having a second input coupled to receive the immediate field in the microinstruction, and having an output for presenting the condition signal to the microsequencer control circuitry responsive to a comparison between values applied to its first and second inputs.

21. The microprocessor of claim 20, wherein the comparator is of a programmable type and capable of performing comparisons of a plurality of types, and has a control input coupled to receive a type field from the microinstruction, the value of the type field controlling the comparator to perform a comparison of a selected type.

22. The microprocessor of claim 20, wherein the condition circuitry further comprises:

a first mask circuit, having a first input coupled to the output of the multiplexer, having a second input coupled to receive a mask field from a microinstruction, and having an output coupled to the first input of the comparator, for forwarding to the comparator a selected subset of bits of the output of the multiplexer corresponding to the value of the mask field; and a second mask circuit, having a first input coupled to receive the immediate field from the microinstruction, having a second input coupled to receive the mask field, and having an output coupled to the second input of the comparator, for forwarding to the comparator a selected subset of bits of the immediate field corresponding to the value of the mask field.

23. The microprocessor of claim 22, wherein the condition circuitry further comprises:

a select field register, having an input coupled to receive the select field from the microinstruction and having an output coupled to the control input of the multiplexer;

an immediate field register, having an input coupled to receive the immediate field from the microinstruction and having an output coupled to the first input of the second mask circuit;

a type field register, having an input coupled to receive the type field from the microinstruction, and having an output coupled to the control input of the comparator; and a mask field register, having an input coupled to receive the mask field from the microinstruction, and having an output coupled to the second input of each of the first and second mask circuits.

24. The microprocessor of claim 23, wherein the condition circuitry further comprises:

a field switch, having an input coupled to receive the immediate field from the microinstruction, for forwarding the immediate field of a first microinstruction to the input of the mask field register, and for forwarding the immediate field of a second microinstruction to the input of the immediate field register.

25. The microsequencer of claim 21, wherein the condition circuitry further comprises:

a select field register, having an input coupled to receive the select field from the microinstruction and having an output coupled to the control input of the multiplexer;

an immediate field register, having an input coupled to receive the immediate field from the microinstruction and having an output coupled to the second input of the comparator; and a type field register, having an input coupled to receive the type field from the microinstruction, and having an output coupled to the control input of the comparator.

26. The microsequencer of claim 16, wherein the condition circuitry comprises:

a counter, for storing a count value;

a multiplexer, having a plurality of inputs, one of which is coupled to the counter to receive the count value therefrom, and each of the other of the plurality of inputs coupled to receive one of the plurality of status values, having a control input coupled to receive the select field in the microinstruction, and having an output;

a comparator having a first input coupled to the output of the multiplexer, having a second input coupled to receive the immediate field in the microinstruction, and having an output for presenting the condition signal to the microsequencer control circuitry responsive to a comparison between values applied to its first and second inputs.

27. The microprocessor of claim 16, wherein the execution unit is a floating-point execution unit, for performing arithmetic operations upon operands having exponent and mantissa portions.

28. The microprocessor of claim 16, further comprising:

a bus interface unit, coupled on one side to the instruction execution pipeline and to the memory, and coupled on the other side to an external bus; and external subsystems coupled to the external bus.

* * * * *